(12) United States Patent
Swenson et al.

(10) Patent No.: US 7,053,011 B2
(45) Date of Patent: May 30, 2006

(54) LASER-BASED TERMINATION OF PASSIVE ELECTRONIC COMPONENTS

(75) Inventors: Edward J. Swenson, Portland, OR (US); Douglas J. Garcia, Beaverton, OR (US); Bruce Stuart Goldwater, Lake Oswego, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 0 days.

(21) Appl. No.: 10/982,316

(22) Filed: Nov. 4, 2004

(65) Prior Publication Data

US 2005/0099835 A1    May 12, 2005

Related U.S. Application Data

(60) Provisional application No. 60/518,378, filed on Nov. 7, 2003.

(51) Int. Cl.
*H01L 21/00* (2006.01)
(52) U.S. Cl. ............................. 438/800; 438/460
(58) Field of Classification Search .......... 438/460, 438/462, 465, 476, 496, 800
See application file for complete search history.

(56) References Cited

U.S. PATENT DOCUMENTS

| | | | |
|---|---|---|---|
| 4,928,254 A * | 5/1990 | Knudsen et al. | 702/136 |
| 5,863,331 A | 1/1999 | Braden et al. | 118/261 |
| 6,555,447 B1 * | 4/2003 | Weishauss et al. | 438/460 |
| 2003/0231457 A1 | 12/2003 | Ritter et al. | 361/306.3 |
| 2004/0090732 A1 | 5/2004 | Ritter et al. | 361/306.1 |

* cited by examiner

*Primary Examiner*—Phuc T. Dang
(74) *Attorney, Agent, or Firm*—Stoel Rives LLP

(57) ABSTRACT

Terminating the ends of passive electronic components entails applying a laser-ablative coating to each of the opposed major surfaces of a substrate. A UV laser beam having a spot size and an energy distribution sufficient to remove the laser-ablative coating from multiple selected regions of the major surfaces is directed for incidence on the substrate. Relative motion between the UV laser beam and substrate effects removal of sufficient amounts of laser-ablative coating to expose the multiple selected regions of the opposed major surfaces. The substrate is then broken into multiple rowbars, each of which includes side margins along which are positioned different spatially aligned pairs of the selected regions of the opposed major surfaces. An electrically conductive material is applied to the side margins to form electrically conductive interconnects between each spatially aligned pair of the selected regions.

25 Claims, 10 Drawing Sheets

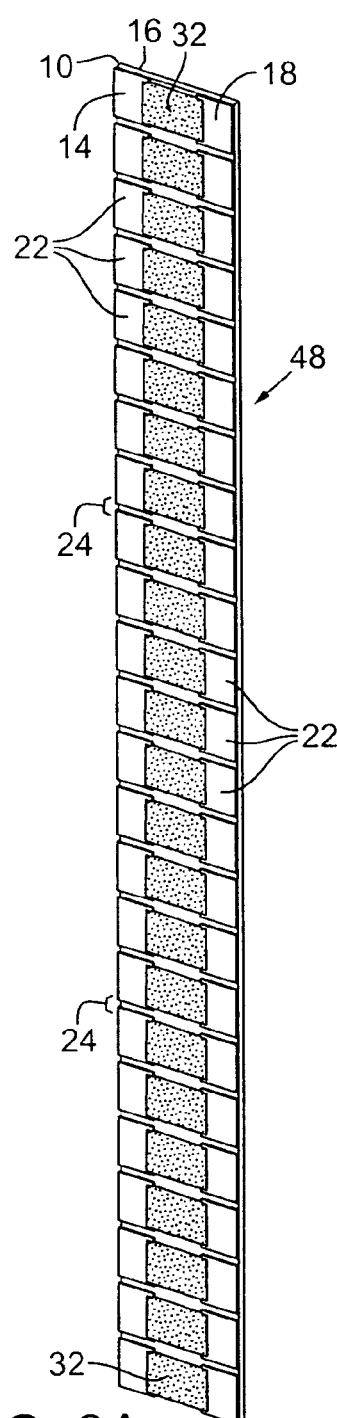
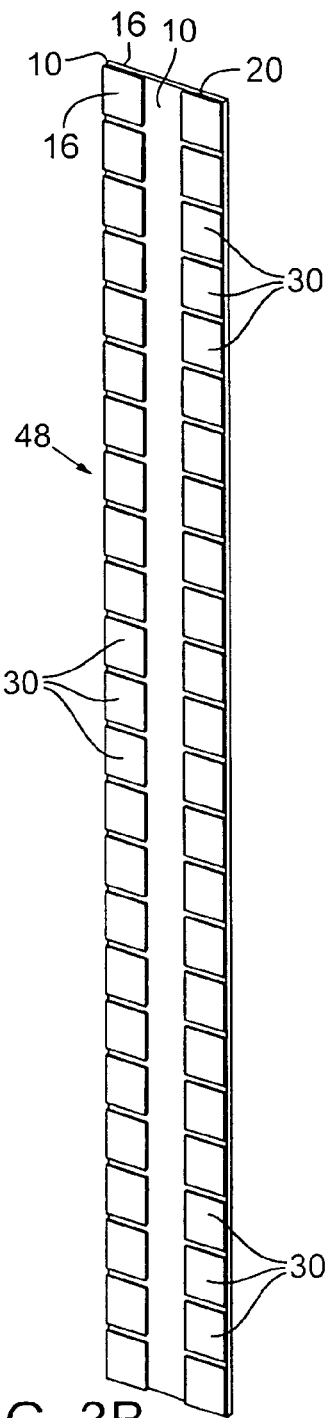
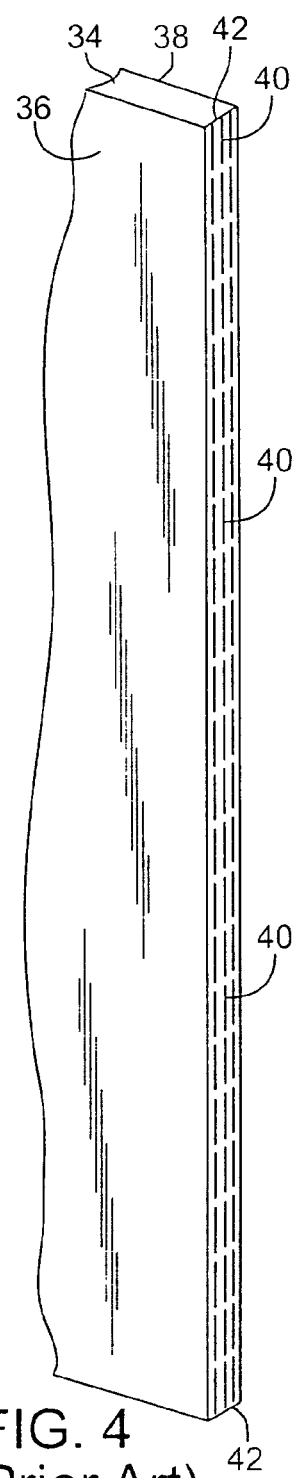
FIG. 3A
(Prior Art)
FIG. 3B
(Prior Art)
FIG. 4
(Prior Art)

LASER-BASED TERMINATION OF PASSIVE ELECTRONIC COMPONENTS

RELATED APPLICATION

This application claims the benefit under 35 U.S.C. § 119(e) of U.S. Provisional Patent Application No. 60/518,378, filed Nov. 4, 2003.

TECHNICAL FIELD

The present invention relates to the efficient and accurate formation of passive electronic components, and more particularly to a method of accurately terminating the ends of next-generation, miniature passive electronic components.

BACKGROUND OF THE INVENTION

Miniature passive electronic circuit components are conventionally fabricated in an array on a substrate. Exemplary types of passive electronic components of interest with regard to the present invention are resistors and capacitors. FIGS. 1A and 1B show an array of resistors in which a substrate 10 includes a first (or upper) major surface 14 and a second (or lower) major surface 16 carrying, respectively, first spaced-apart segmented electrical conductor lines 18 and second spaced-apart segmented electrical conductor lines 20 (end portions of which shown in dashed lines in FIG. 1B). Segmented conductor lines 18 are in parallel alignment, and segmented conductor lines 20 are in parallel alignment.

Each segmented conductor line 18 is composed of multiple electrode pads 22, adjacent ones of which are separated from each other by a small distance 24 and all of which are aligned along first major surface 14. Except for the two terminal end segmented conductor lines 18, each segmented conductor line 18 is positioned between two neighboring segmented conductor lines 18 and is separated from one of them by a relatively wide space 26 and from the other of them by a relatively narrow space or street 28u. Similarly, each segmented conductor line 20 is composed of multiple electrode pads 30, adjacent ones of which are separated from each other by a small distance 24 and all of which are aligned along second major surface 16. Except for the two terminal end segmented conductor lines 20, each segmented conductor line 20 is positioned between two neighboring segmented conductor lines 20 and is separated from one of them by a relatively wide space 26 and from the other one of them by a street 28l.

The electrical conductor lines are also arranged in spatially aligned pairs of one electrical conductor line 18 on first major surface 14 and one electrical conductor line 20 on second major surface 16. First major surface 14 further includes multiple regions of resistive material 32 positioned in spaces 26 between electrode pads 22 of adjacent electrical conductor lines 18, as shown in FIGS. 1A and 1B. Second major surface 16 may also include regions of resistive material 32 in spaces 26 between adjacent electrode pads 30 of electrical conductor lines 20, which regions 32 are not shown in the drawing figures.

FIGS. 2 and 4 show a substrate of dielectric material 34 that is used in the fabrication of capacitors. Substrate 34 includes a first (or upper) major surface 36 and a second (or lower) major surface 38 between which multiple spaced-apart sheet electrodes 40 are internally stacked in plane parallel arrangement. FIG. 4 shows exposed side margins 42 of internal electrodes 40. There is no electrical conductor line formed on either of major surfaces 36 and 38.

Substrates 10 and 34 are cut, sometimes called diced, to singulate the passive electronic components. FIGS. 3A and 3B show first and second major surfaces 14 and 16, respectively, of substrate 10 after it has been broken apart to form multiple rowbars 48 of resistors. Rowbars 48 are then cut into separate chip resistors 52 (shown in FIG. 5). Capacitors 54 (shown in FIG. 6) are formed by dicing substrate 34 without formation of rowbars. Each chip resistor 52 includes an electrically conductive interconnect 56 that extends between electrical conductor lines 18 and 20 in each spatially aligned pair of them. Capacitor 54 includes an electrically conductive interconnect 58 that bridges across side margins 42 of internal electrodes 40. Conductive interconnects 56 are formed by applying a metal coating (e.g., a silver paste) to a side margin portion 60 of resistor substrate 10. Great precision is needed when forming conductive interconnects 56 and 58 to ensure that none of the metal coating extends across a region of resistive material 32 or connects both conductive interconnects 58 across first or second major surfaces 36 and 38, and thereby forms an electrically conductive bridge that would cause the resulting chip resistor 52 or capacitor 54 to become a short circuit.

Most prior art methods of forming conductive interconnects 56 between spatially aligned pairs of electrical conductor lines 18 and 20 entail applying a resist coating that covers and protects regions of resistive material 32 defined by spaces 26 between electrode pads 22 on major surface 14 while the metal coating is applied. However, recent technological advancements in component miniaturization have resulted in the formation of chip resistors 52 having respective length and width dimensions of about 0.6 mm×0.3 mm (0201 chip resistors) and a thickness of between about 90 microns and about 150 microns, as compared to prior art 0402 chip resistors having respective length and width dimensions of about 1.0 mm×0.5 mm. The small sizes of chip resistors 52 make accurate and efficient application of the resist coating exceedingly difficult to achieve. Consequently, chip manufacturers have begun to form conductive interconnects 56 on rowbars 48 rather than on discrete chip resistors 52 because rowbars 48 are significantly larger in size (typically having respective length and width dimensions of between about 36 mm and about 80 mm and between about 3.2 mm and about 0.6 mm) and are thus easier to handle during processing.

One prior art method of forming conductive interconnects 56 on chip resistors 52 entails cutting substrate 10 into multiple rowbars 48 and then dipping side margins 60 of each rowbar 48 into the metal coating. However, accurate application of the metal coating by dipping becomes virtually impossible as the size of rowbar 48 and chip resistor 52 decreases. Consequently, the metal coating bridges regions of resistive material 32 and causes the resulting chip resistor 52 to become a short circuit.

A second prior art method of forming conductive interconnects 56 on chip resistors 52, described in U.S. Pat. No. 5,753,299 to Garcia et al., entails screen printing the resist coating onto rowbars 48 so that the resist coating covers only selected regions of resistive material 32. The resist material-coated rowbars 48 are then sputter-coated with the metal coating to form conductive interconnects 56. Lastly, the resist coating is removed from rowbars 48 to expose regions of resistive material 32, and rowbar 48 is cut to form multiple individual chip resistors 52. Screen printing is a mechanical process and thus has inherent size limitations that have been reached. Specifically, screen printing is becoming ineffective to form next-generation, miniature chip resistors because this method cannot provide sufficient electrical conductor line straightness or accuracy. Further, screen printing results in the formation of nonuniform lines, and the resulting ragged edges predominate in the next-generation, miniature chip resistors.

A third prior art method of forming conductive interconnects 56 entails assembling numerous rowbars 48 face-to-face in a tight stack to form a fixture that is then sprayed with the metal coating. The uppermost and lowermost (terminal) rowbars 48 in the fixture are sacrificed because regions of resistive material 32 on these terminal rowbars 48 are oversprayed with the metal coating. Conductive interconnects 56 are, however, formed on the other stacked rowbars 48. Lastly, each rowbar 48 is cut to form multiple chip resistors 52.

Regarding terminating the ends of capacitors, conventional termination systems terminate the ends when they are in singulated, discrete capacitor form. More specifically, the most common prior art method of forming conductive interconnect 58 on unterminated capacitors entails holding a discrete, unterminated capacitor by its end and dipping it into a viscous termination paste. Once the paste has dried, the discrete, partly terminated capacitor is repositioned for dipping the opposite end into the viscous termination paste. Accurate application of the termination paste by dipping becomes virtually impossible as the sizes of capacitors 54 decrease. Consequently, a metal coating bridging both conductive interconnects 58 would cause the resulting nominal capacitor 54 to become a short circuit.

Because they are approaching their physical limits, all of the prior art methods are inadequate for accurately terminating the ends of next-generation, miniature passive electronic components, including chip resistors and capacitors. Consequently, a need has arisen for a highly efficient and accurate method of terminating next-generation, miniature passive electronic components.

SUMMARY OF THE INVENTION

An object of the present invention is, therefore, to provide a method of forming conductive interconnects between electrically conductive regions formed on opposed surfaces of passive electronic components to terminate their ends.

A preferred method of the present invention entails applying a laser-ablative coating, preferably a nonphotosensitive coating, to each of first (upper) and second (lower) major surfaces of a substrate. The first and second major surfaces support respective first and second mutually spaced-apart electrical conductor lines arranged lengthwise in spatially aligned different pairs of one first electrical conductor line and one second electrical conductor line. A UV laser beam having a spot size and an energy distribution sufficient to remove the laser-ablative coating from selected regions of the first and second major surfaces is aligned with and directed for incidence on the substrate. The UV laser beam and substrate move relative to each other to remove sufficient amounts of the laser-ablative coating and thereby expose at least a portion of the lengths of the first and second electrical conductor lines. The substrate is then broken into multiple rowbars, each of which includes side margins along which run different spatially aligned pairs of first and second electrical conductor lines. An electrically conductive coating material is applied to the side margins of the rowbars to form electrically conductive interconnects between each spatially aligned pair of electrical conductor lines.

Certain types of substrates do not support electrical conductor lines on the second (lower) major surface, thereby leaving it vacant. To practice the preferred method on such substrates for resistors, the UV laser beam removes amounts of laser-ablative coating from the second major surface to expose the vacant locations where electrical conductor lines would have been supported to form the previously described spatially aligned pairs. Upon formation of the rowbars, the electrically conductive coating material is applied to form electrical conductor lines in the exposed vacant locations and to the rowbar side margins to interconnect the newly formed electrical conductor lines on the second major surface and the previously existing electrical conductor lines on the first major surface.

To practice the method on substrates having vacant first and second major surfaces for use in capacitors, the UV laser beam removes amounts of laser-ablative coating from the first and second major surfaces to expose thin stripes of dielectric material where electrically conductive regions are to be formed. Upon formation of the rowbars, the electrically conductive coating material is applied to bridge across and thereby connect the side margins of the internal electrodes and bond to the exposed dielectric material on the first and second major surfaces. These methods carried out on substrates not supporting electrical conductor lines can also be applied to other passive electronic components, including chip inductors and varistors.

A preferred option of the method includes removing from the rowbars residual amounts of the laser-ablative coating following formation of the conductive interconnects.

Although use of a UV laser beam to remove the laser-ablative coating is preferred, the method can be practiced using lasers emitting different wavelengths of light to remove amounts of a different, wavelength compatible laser-removable coating.

In a first preferred embodiment, the substrate includes ceramic material and supports a region of resistive material, and the type of passive electronic component formed is a resistor.

In a second preferred embodiment, the substrate includes dielectric material, and the type of passive electronic component formed is a capacitor.

Preferred implementations of the method entail forming multiple scribe lines in one or both of the major surfaces of the substrate. Each scribe line is positioned in an area called a "street," which lies between and runs generally parallel or perpendicular to the lengths of adjacent electrical conductor lines. A breakage force applied to either side of the scribe line effects clean breakage of the substrate into separate passive electronic components having side margins defined by the scribe line. The scribe line is preferably formed by directing a UV laser beam along the substrate such that a portion of the thickness of the substrate is removed to form a shallow trench. The trench has a diminishing width that converges from the substrate surface to the bottom of the trench to define a sharp snap line. The UV laser beam is characterized by an energy distribution and a spot size sufficient to form the scribe line in the absence of appreciable substrate melting, so that the clearly defined, sharp snap line forms a region of high stress concentration extending into the thickness of the substrate and along the length of the snap line. Consequently, multiple depthwise fractures propagate into the thickness of the substrate in the region of high stress concentration in response to a breakage force applied to either side of the trench to effect clean breakage of the substrate into separate circuit components having side margins defined by the snap line.

Use of a UV laser to ablate the laser-ablative coating and to form a scribe line is preferred because switching between the two UV laser processing operations entails only introducing beam shaping optics and beam power adjustment. A laser beam of Gaussian shape is used to form scribe lines, and a laser beam of uniform shape formed by inserting a beam shaping objective lens is used to ablate the laser-ablative coating.

Additional aspects and advantages of this invention will be apparent from the following detailed description of preferred embodiments, which proceeds with reference to the accompanying drawings.

BRIEF DESCRIPTION OF THE DRAWINGS

FIGS. 3A and 3B are respective isometric views of front-side and rear-side major surfaces of a prior art rowbar formed by breaking the substrate plate of FIGS. 1A and 1B in a vertical direction between adjacent electrical conductor lines.

FIG. 4 is a fragmentary isometric view showing a side margin of the substrate plate of FIG. 2 as seen from either one of the front-side or rear-side major surfaces of the substrate plate.

DETAILED DESCRIPTION OF PREFERRED EMBODIMENTS

Figure 1A:
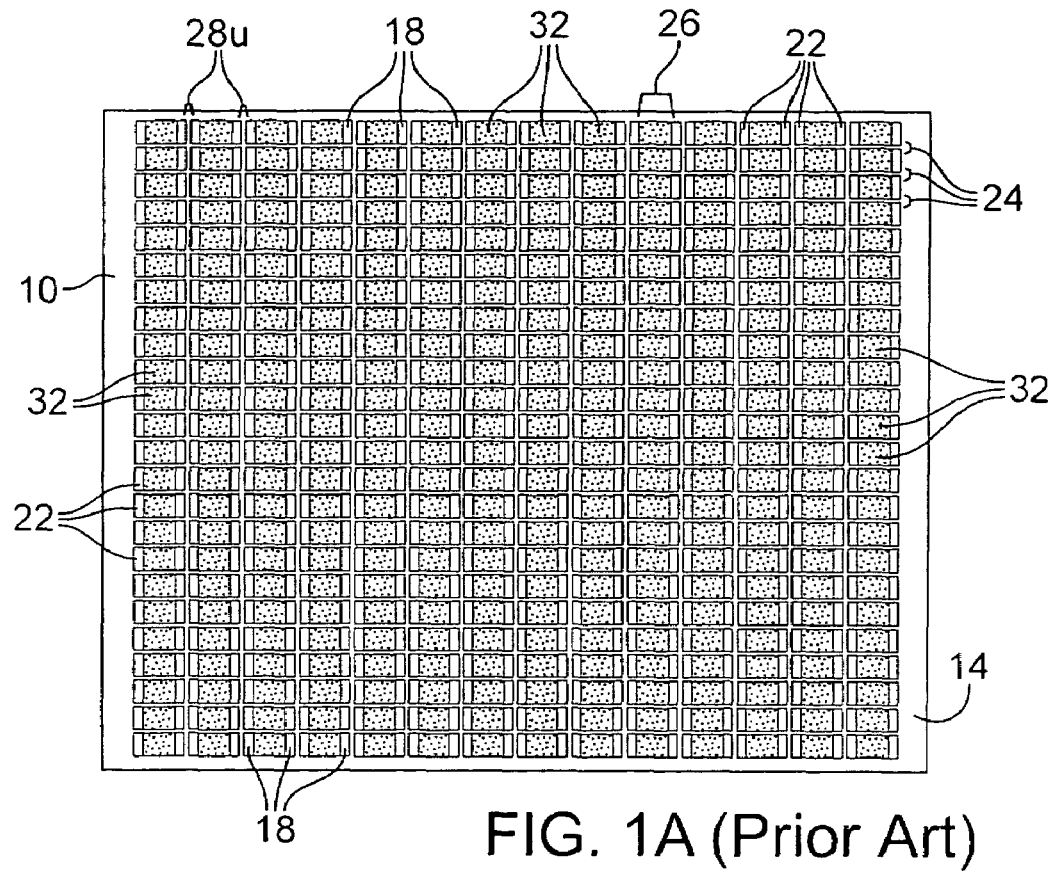
FIG. 1A is a plan view of a prior art substrate plate carrying an array of regions of resistive material positioned between adjacent electrical conductor lines such that, when diced and terminated, multiple discrete chip resistors are formed.
Figure 1B:
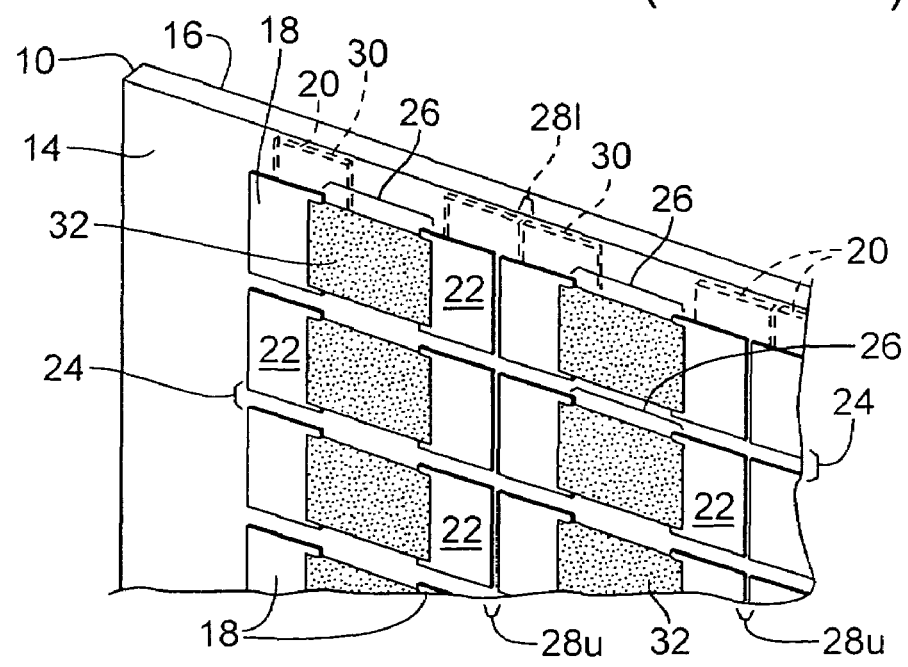
FIG. 1B is an enlarged fragmentary isometric view of several regions of resistive material positioned between adjacent electrical conductor lines located in the upper left-hand corner of the prior art substrate plate of FIG. 1A.
Figure 2:
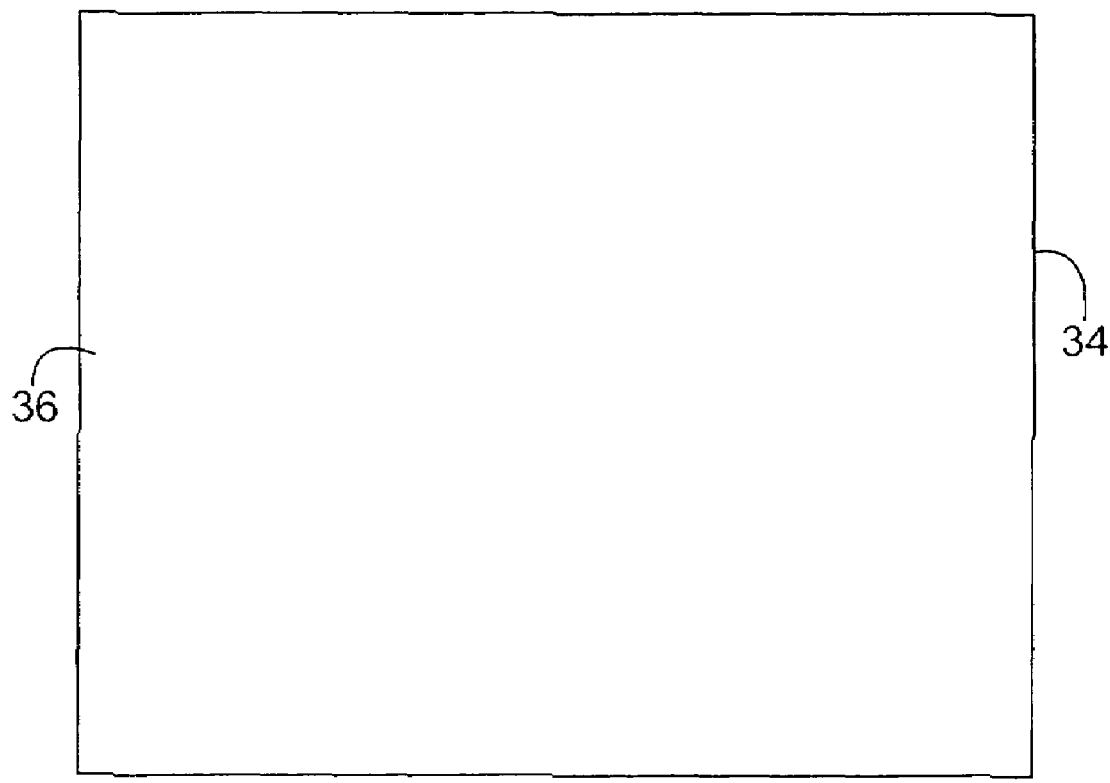
FIG. 2 is a plan view of a prior art substrate plate that, when diced and terminated, forms multiple discrete capacitors.
Figure 5:
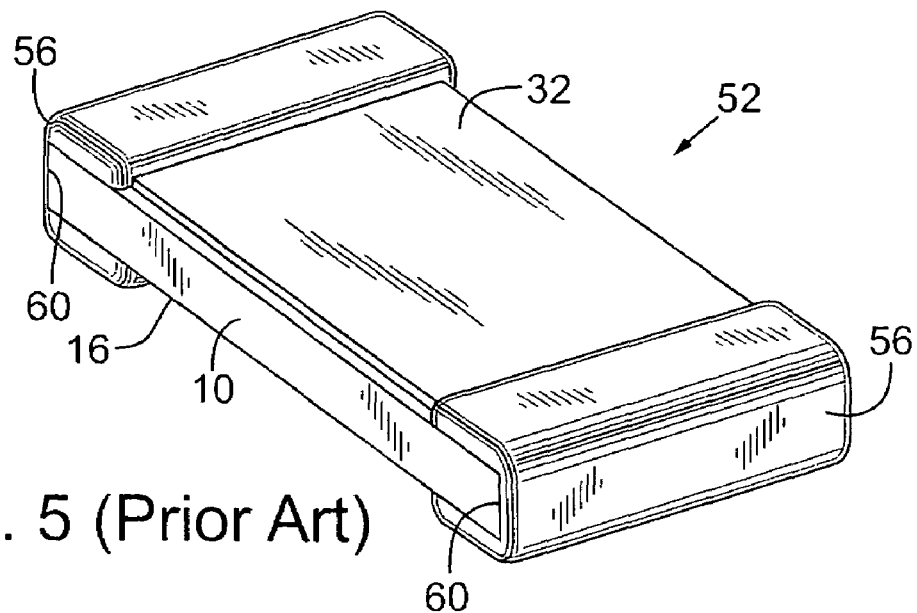
FIG. 5 is an isometric view of one of multiple prior art resistors formed by dicing and terminating the rowbar of FIGS. 3A and 3B into separate, discrete resistors.
Figure 6:
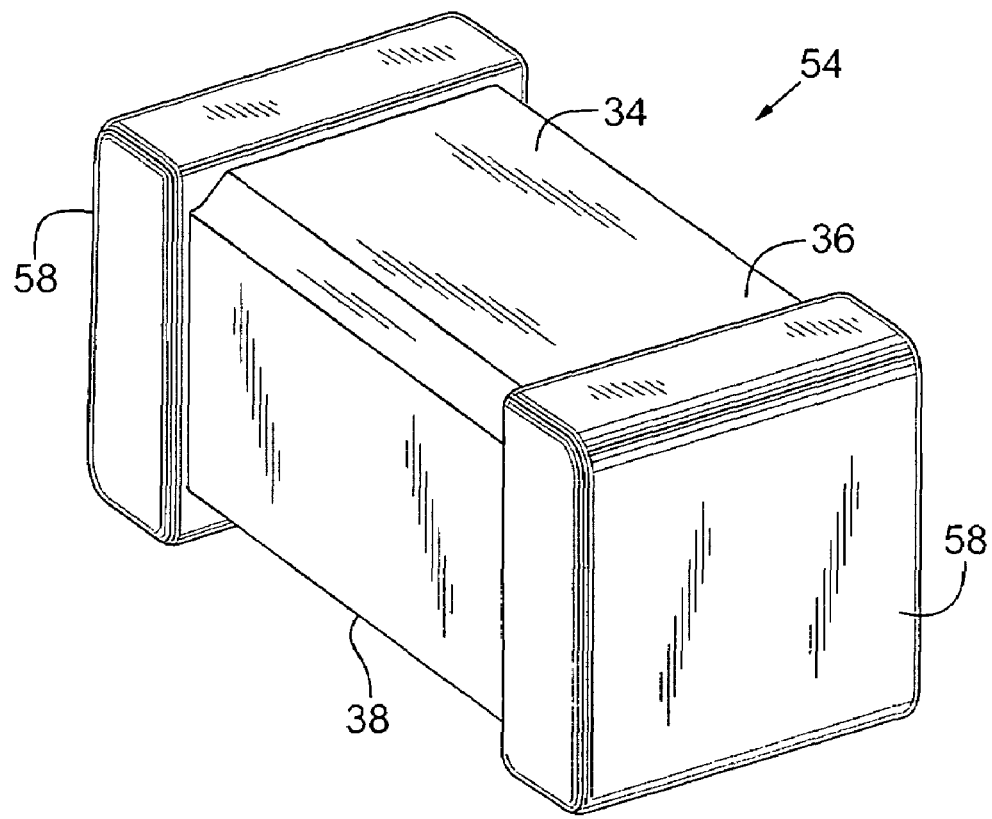
FIG. 6 is an isometric view of one of multiple prior art capacitors formed by dicing and terminating the rowbar of FIG. 4 into separate, discrete capacitors.

As discussed above, prior art methods of forming a conductive interconnect between each electrical conductor in a spatially aligned pair of electrical conductors entailed successively applying to a rowbar a resist coating and then a metal coating. However, these prior art methods are quickly becoming inadequate in light of technological advancements that have led to the formation and use of miniature, next-generation passive electronic components.

A preferred method of the present invention, in contrast, entails applying a laser-ablative coating to the substrate while it is in plate form, directing a uniform-shaped laser beam emitted by a UV laser along the lengths of the electrical conductor lines to remove the laser-ablative coating in sufficient amounts to expose them, breaking the substrate plate into multiple rowbars having exposed side margins, and metallizing the side margins of the rowbars to form conductive interconnects. Because a laser-ablative coating is applied while the electronic circuit components are in their larger-sized substrate plate form, greater accuracy and efficiency can be achieved than when attempting to apply the resist coating to the smaller-sized rowbar form in accordance with prior art techniques. A UV laser is preferred because organic materials, of which the laser-ablative coating is made, are cleanly ablated by UV wavelengths of laser radiation.

Preferred methods of the present invention may be used to terminate the ends of various passive electronic components. The term "substrate" used in connection with passive electronic components herein refers to single layer structures as well as consolidated stack, multi-layer, and laminated multi-layer structures. Passive electronic component substrates are of different types including, but not limited to, preferred ceramic and ceramic-like materials described below.

A first type is a ceramic substrate constructed in either single layer or multi-layer plate form including green (soft) or fired (hard) plates of, for example, high temperature co-fired ceramic (HTCC) or low temperature co-fired ceramic (LTCC) materials.

A second type is a single layer fired ceramic substrate patterned with individual (chip) resistors, or resistor networks; piezoelectric, electro-optic, or optoelectronic devices; inductors; or other individual components built on the larger multielement ceramic substrate.

A third type is implemented with multi-layer ceramic technology, including, for either HTCC or LTCC materials, chip capacitors, networks composed of arrays of multiple component types (e.g., resistors, capacitors, and inductors), and HTCC and LTCC electronic packages containing passive components or electronic packages for use as interposers connecting semiconductor (e.g., silicon) devices to other electronic packages.

A fourth type is a specialized ceramic substrate, either fired or unfired, and of either single layer or multi-layer construction, such as, for example, a substrate of a varistor or a thermistor. Single layer construction of thermistor and varistor substrates is referred by skilled persons to any one of discs, rods, washers, slabs, plates, tubular shapes, and beads.

Exemplary preferred methods of the present invention will be described first with reference to the formation of discrete chip resistors and then with reference to the formation of discrete chip capacitors.

Figure 7:
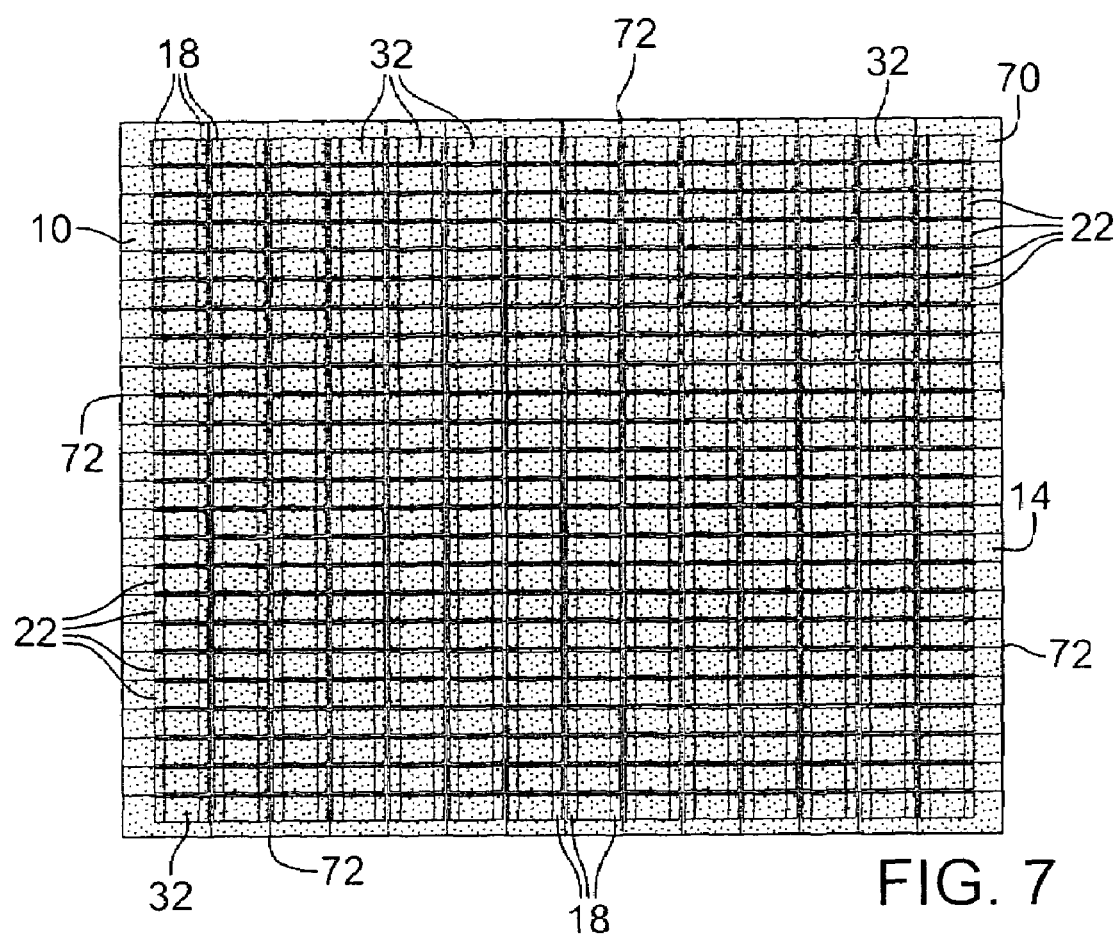
FIG. 7 is a plan view of a prescribed substrate plate of the type shown in FIGS. 1A and 1B in which the major surface carrying resistive material is covered with a laser-ablative coating.

With respect to the formation of chip resistors 52, a preferred method of the present invention entails applying a laser-ablative coating 70 to each of first major surface 14 and second major surface 16 of substrate 10, as shown in FIG. 7 for major surface 14. Substrate 10 is preferably a ceramic material but could be an alternative material having the appropriate electrical and mechanical properties. A preferred laser-ablative coating 70 is a nonphotosensitive, laser-ablative resist, which is an organic material. Laser-ablative coating 70 can, but need not be, a polyimide; it can be any laser-ablative resist material that is compatible with the chosen substrate 10. Laser-ablative coating 70 preferably entirely covers each of first and second major surfaces 14 and 16 of substrate 10.

Figure 8A:
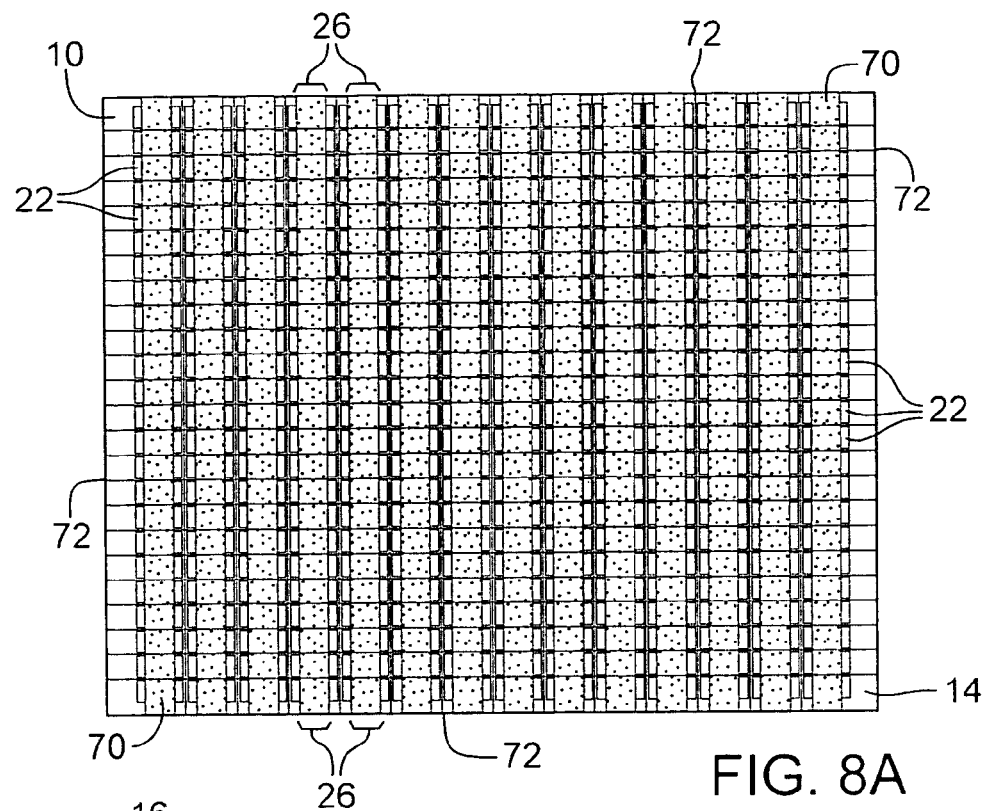
FIG. 8A is a plan view of the resistive material-carrying upper major surface of the substrate plate of FIG. 7 after exposure of laser ablative material-coated electrical conductor lines to UV laser output.
Figure 8B:
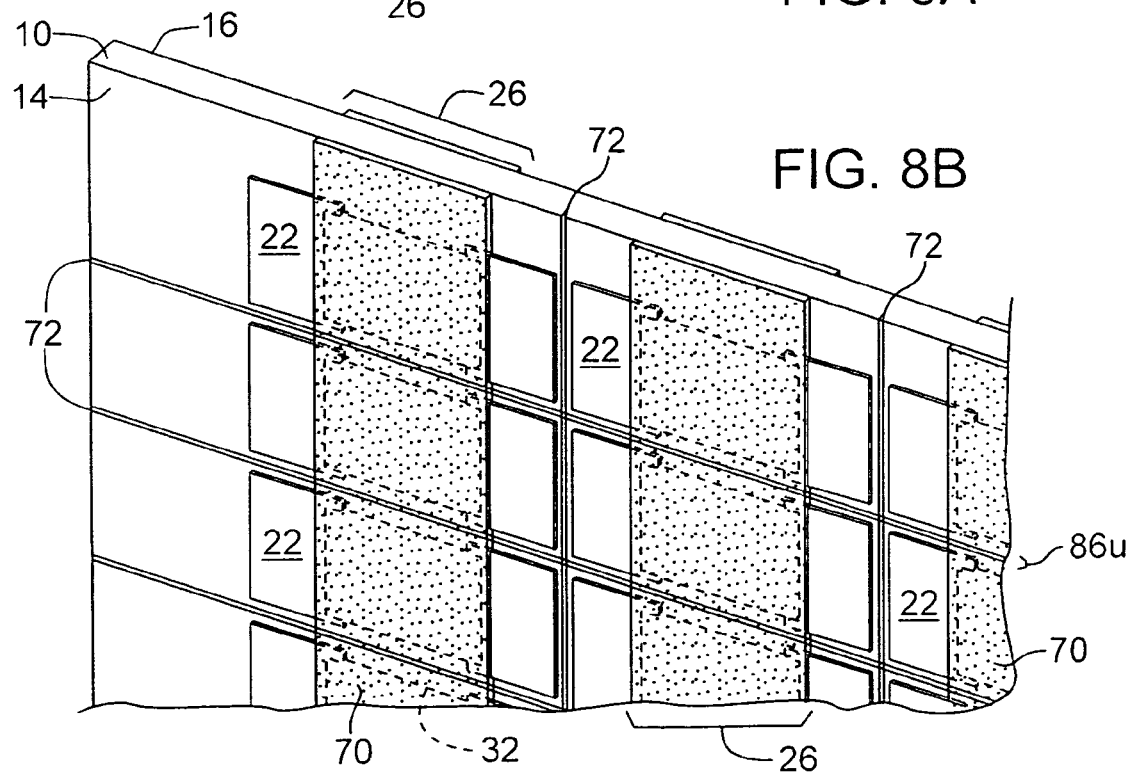
FIG. 8B is an enlarged fragmentary isometric view of the exposed portions of the electrically conductive lines located in the upper left-hand corner of the substrate plate of FIG. 8A.
Figure 8C:
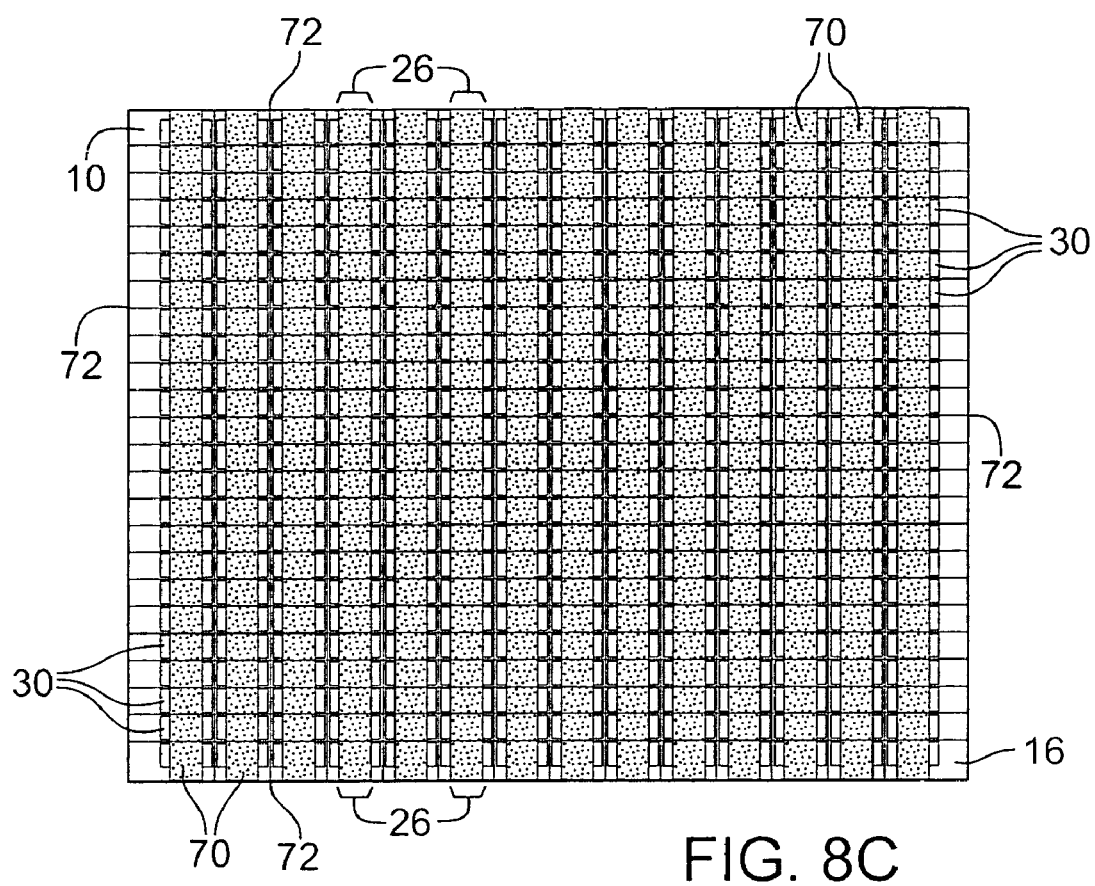
FIG. 8C is a plan view of the lower major surface of the substrate plate of FIG. 7 after exposure of laser ablative material-coated electrical conductor lines to UV laser output.

Next, a UV laser beam having a spot size and an energy distribution sufficient to remove the laser-ablative coating from selected regions of first and second major surfaces 14 and 16 is aligned and directed for incidence on substrate 10. The UV laser beam is directed along at least a portion of the length of each of electrical conductor lines 18 and 20 that form a spatially aligned pair, thereby removing sufficient amounts of laser-ablative coating 70 to expose at least a portion of the length of each of first and second conductor lines 18 and 20, as is shown in FIGS. 8A, 8B, and 8C. FIGS. 8A and 8B show laser-ablative coating 70 remaining on regions of resistive material 32 and small portions of electrode pads 22 on first major surface 14 of substrate plate 10. FIG. 8C shows laser-ablative coating 70 remaining on regions defined by spaces 26 between electrode pads 30 on second major surface 16. Removal of laser-ablative coating 70 from at least a portion of first and second major surfaces 14 and 16 may be performed simultaneously or successively from one and then the other of first and second major surfaces 14 and 16.

A preferred UV laser emits a uniform-shaped laser beam having a wavelength of less than 400 nm, more preferably 355 nm, 266 nm, or 213 nm. (A UV laser is defined as one that emits light having a wavelength shorter than 400 nm.) A preferred laser for use in the method of the present invention is a Q-switched, diode-pumped, solid-state UV laser that includes a solid-state lasant, such as Nd:YAG, Nd:YLF, Nd:YAP, or Nd:YVO4, or a YAG crystal doped with holmium or erbium. UV lasers are preferred because most laser-ablative resist coatings exhibit strong absorption in the UV range; however, any laser source that generates a laser beam having a wavelength that cleanly removes organic materials may be used. A preferred laser provides harmonically generated UV laser output of one or more laser pulses at a wavelength such as 355 nm (frequency tripled Nd:YAG), 266 nm (frequency quadrupled Nd:YAG), or 213 nm (frequency quintupled Nd:YAG) with primarily a TEM00 spatial mode profile. Laser output having a wavelength of 355 nm is especially preferred because the harmonic crystalline availability and intracavity doubling at this wavelength allow for the greatest available power and pulse repetition rate. The laser preferably has a round or square uniform beam, the bottom area of which has a diameter or side length of between about 30 microns and about 300 microns. The laser is preferably operated at a high repetition rate of between about 15 kHz and about 100 kHz and a power level of between about 0.5 W and about 10 W. The pulse length is preferably about 30 ns, but can be any appropriate pulse length. The UV laser beam preferably has an energy per pulse of between about 50 μJ and about 1000 μJ.

The UV laser pulses may be converted to expanded collimated pulses by a variety of well-known optical devices, including beam expander or upcollimator lens components (with, for example, a 2× beam expansion factor), that are positioned along a laser beam path. A beam positioning system typically directs collimated pulses through a beam shaping objective lens to a desired laser target position on the ceramic substrate. The beam positioning systems incorporated in Model Series Nos. 43xx and 44xx small-area micromachining systems manufactured by Electro Scientific Industries, Inc., Portland, Oreg., the assignee of this patent application, are suitable for implementing the present invention to ablate laser-ablative coatings on smaller (i.e., smaller than 10.2 cm×10.2 cm (4 in×4 in)) ceramic substrates. Some of these systems, which use an X-Y linear motor for moving the substrate and an X-Y stage for moving the beam shaping objective lens, are cost-effective positioning systems for making long, straight cuts. Skilled persons will appreciate that a system with a single X-Y stage for substrate positioning, with a fixed beam position and beam shaping optics, may alternatively be employed.

Figure 9:
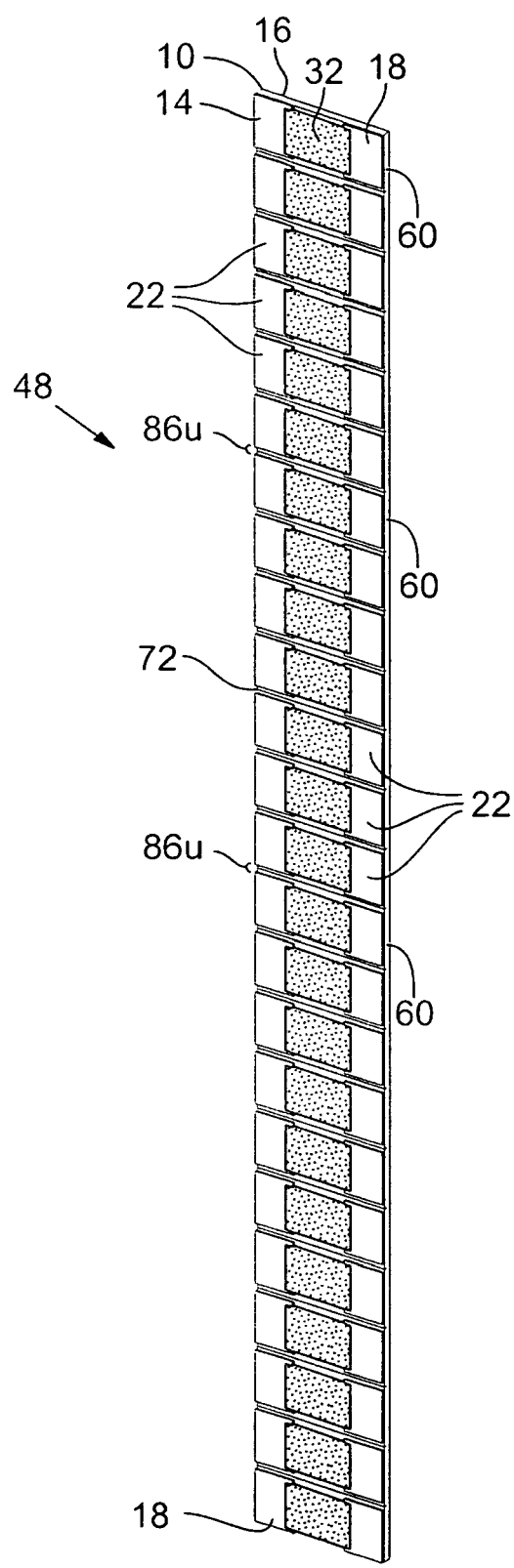
FIG. 9 is an isometric view of the resistive material-carrying upper major surface of a resistor rowbar formed by breaking the substrate plate of FIGS. 8A, 8B, and 8C.

Next, substrate plate 10 is broken into multiple rowbars 48, each of which includes side margins 60 along which run different spatially aligned pairs of first and second electrical conductor lines 18 and 20. Rowbars 48 are shown in FIG. 9. Exemplary rowbars 48 are used in forming type 0402 chip resistors.

Figure 10:
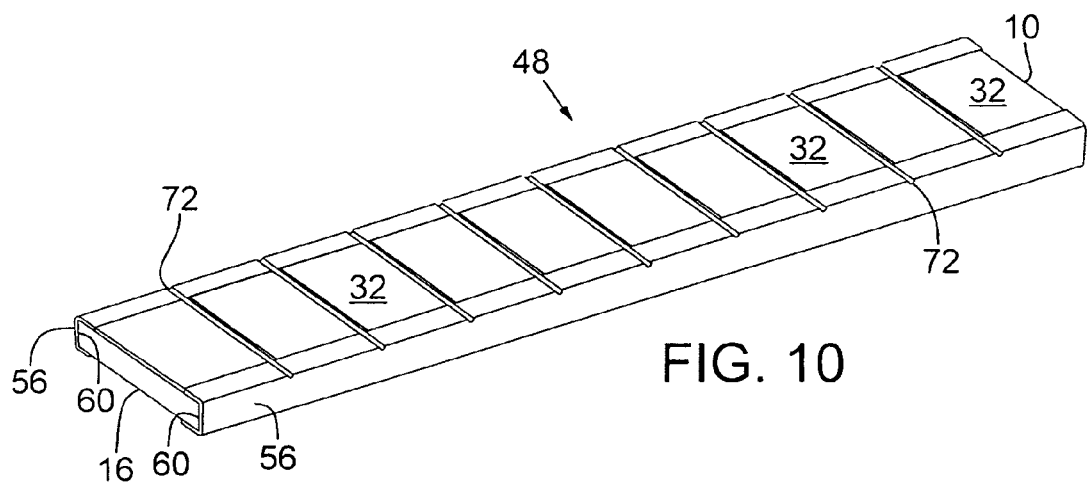
FIG. 10 is an isometric view of the rowbar of FIG. 9 having metallized side margins that form conductive interconnects between spatially aligned pairs of electrical conductor lines.

An electrically conductive material is applied to side margins 60 of rowbars 48 to form a conductive interconnect 56 between each of the electrical conductor lines 18 and 20 that comprise a spatially aligned pair. FIG. 10 is a diagram of rowbar 48 having side margins 60 that have been coated with an electrically conductive material to form conductive interconnects 56. The electrically conductive material is typically applied as a metallic paste to rowbar 48. The paste is preferably spread onto side margins 60 in a continuous layer of substantially uniform thickness, because voids in the paste could result in conductive interconnect discontinuities. Further, if the applied paste layer is too thick, the width of the resulting conductive interconnect 56 and its uniformity could be adversely affected. Exemplary methods of applying the metallic paste include metering, spreading, and sputtering. The paste may optionally be subsequently dried by heating or at ambient temperature to set conductive interconnects 56. Once laser-ablative coating 70 is in place, rowbars 48 can be completely covered with the electrically conductive material because laser-ablative coating 70 protects the entire rowbar 48 except for exposed electrical conductor lines 18 and 20 and their related side margins 60. Thus the electrically conductive coating covers only these areas and thereby forms conductive interconnects 56. Following application of the electrically conductive material and the formation of conductive interconnects 56, rowbar 48 is broken into multiple chip resistors 52.

Breakage of substrate 10 into multiple rowbars 48 may be effected in numerous ways. One exemplary preferred method entails forming scribe lines 72 (shown in FIGS. 7, 8A, 8B, and 8C) in substrate 10 by directing a UV laser beam along the lengths of streets 28u that extend along major surface 14 of substrate 10 and that are substantially parallel to electrical conductor lines 18. Substrate 10 absorbs at least a portion of the energy emitted by the laser beam, thereby effecting depthwise removal of a portion of substrate 10 to form shallow trenches along streets 28u created by patterns formed on substrate 10 by electrical conductor lines 18 and regions of resistive material 32. Upon application of a breakage force to substrate 10 on either side of each scribe line 72 of street 28u, substrate plate 10 breaks into separate rowbar pieces 48, each of which includes multiple chip resistors 52. Preferred lasers for use in forming scribe line 72 are the same as the lasers described above for use in effecting removal of laser-ablative coating 70 from electrical conductor lines 18, with the beam shaping objective lens removed to provide a beam of Gaussian shape. A preferred depth of the scribe line is about 10% of the depth of substrate 10, which for a 250 micron thick substrate is 25 microns.

Breakage of rowbars 48 into multiple, discrete chip resistors 52 entails forming scribe lines 72 in substrate 10 by directing a UV laser beam along the lengths of streets 86u that extend along major surface 14 of substrate 10 and that are substantially perpendicular to electrical conductor lines 18. Each scribe line 72 on a street 86u is preferably formed as described above. Upon application of a breakage force to rowbar 48 on either side of scribe line 72, rowbar 48 breaks into multiple, separate chip resistors 52.

In a preferred embodiment, scribe lines 72 on streets 28u that are used to break substrate 10 into rowbars 48 and streets 86u that are used to break the rowbars 48 into multiple, separate chip resistors 52 are formed in substrate 10 either before substrate 10 is coated with laser-ablative coating 70 or before the UV laser effects removal of laser-ablative coating 70 along the lengths of electrical conductor lines 18 ("prescribing"). One advantage of prescribing is that it minimizes the handling of rowbars 48 following application of the laser-ablative coating.

In a further preferred embodiment, the scribe lines 72 formed along streets 28u and used to break the substrate 10 into rowbars 48 are deeper than the scribe lines 72 formed along streets 86u and used to singulate rowbar 48 into multiple, separate chip resistors 52. The depths of scribe lines 72 on streets 86u depends on whether a metal layer, e.g., an electrical conductor line, is present on lower major surface 16 with no scribe line. The depth of a scribe line 72 may be about 5%–8% of the substrate thickness in absence of a metal layer and equal to or greater than 10% in the presence of a metal layer.

The method of the present invention preferably further entails removing residual laser-ablative coating 70 from chip resistors 52 having conductive interconnects 56. While removal of residual laser-ablative coating 70 may be effected by various methods, the chosen method must be compatible with the resistive material used. One exemplary removal method entails firing chip resistors 52 in an oven. Another exemplary method entails using a water-soluble laser-ablative coating that may be removed by washing with water or another solvent. This process may be accompanied by abrasive action. Alternatively, residual laser-ablative coating 70 could remain in place.

Figure 11:
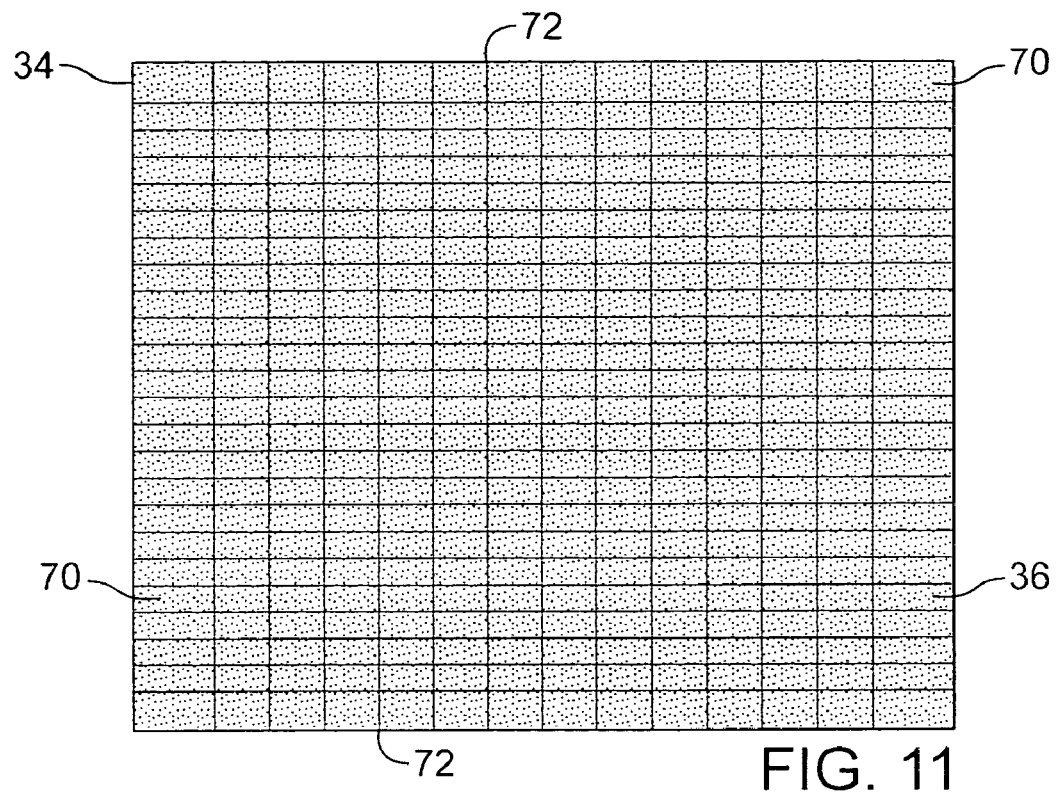
FIG. 11 is a plan view of a prescribed substrate plate of the type shown in FIG. 2 in which one of the major surfaces is coated with a laser-ablative coating.

With respect to the formation of discrete capacitors 54, a preferred method of the present invention entails applying laser-ablative coating 70 to both of prescribed first and second major surfaces 36 and 38 of substrate 34, as shown in FIG. 11 for major surface 36. As stated above, substrate 34 includes a dielectric material and is preferably formed of multiple layers of ceramic material. The ceramic material is prescribed before the firing operation because the ablation threshold of soft ceramic material is lower. Laser-ablative coating 70 is applied after the firing process, which would eliminate coating 70 if it were present. Both of major surfaces 36 and 38 are prescribed to facilitate breakage of the relatively thick dielectric substrate 34. Alternatively, all process steps can be done before firing, including adding the termination metal and firing the complete structure in one operation.

Figure 12:
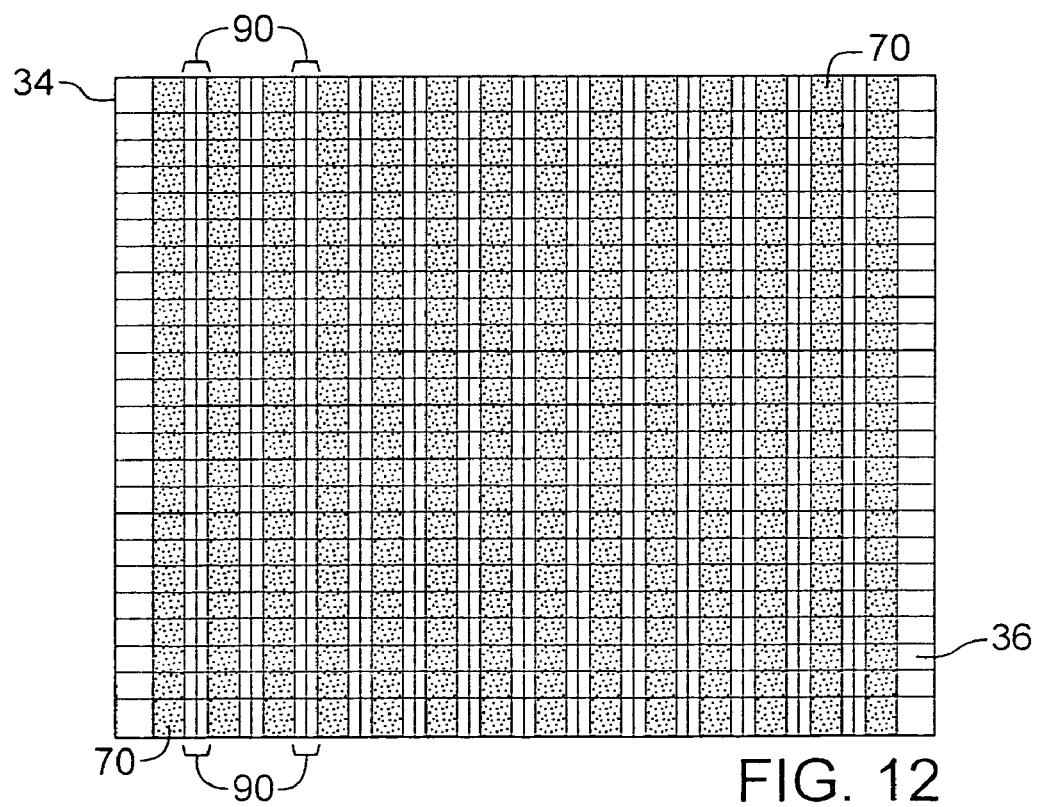
FIG. 12 is a plan view of the major surface of the substrate plate shown in FIG. 11 after a UV laser removed stripes of laser-ablative coating material.

As is described above with reference to resistors, a UV laser beam having a spot size and an energy distribution sufficient to remove the laser-ablative coating from selected regions of first and second major surfaces 36 and 38 is then aligned and directed for incidence on substrate 34. The UV laser beam is directed to remove amounts of laser-ablative coating 70 from first and second major surfaces 36 and 38 to expose stripes 90 of dielectric material where electrically conductive regions are to be formed, as is shown in FIG. 12. One of the major advantages of the laser process is its ability to compensate for shrinkage and warpage and thereby permit laser ablation along nonorthogonal or not perfectly straight lines. The lasers used to remove laser-ablative coating 70 and the parameters at which these lasers are preferably operated are the same as those described above with respect to chip resistors.

Figure 13:
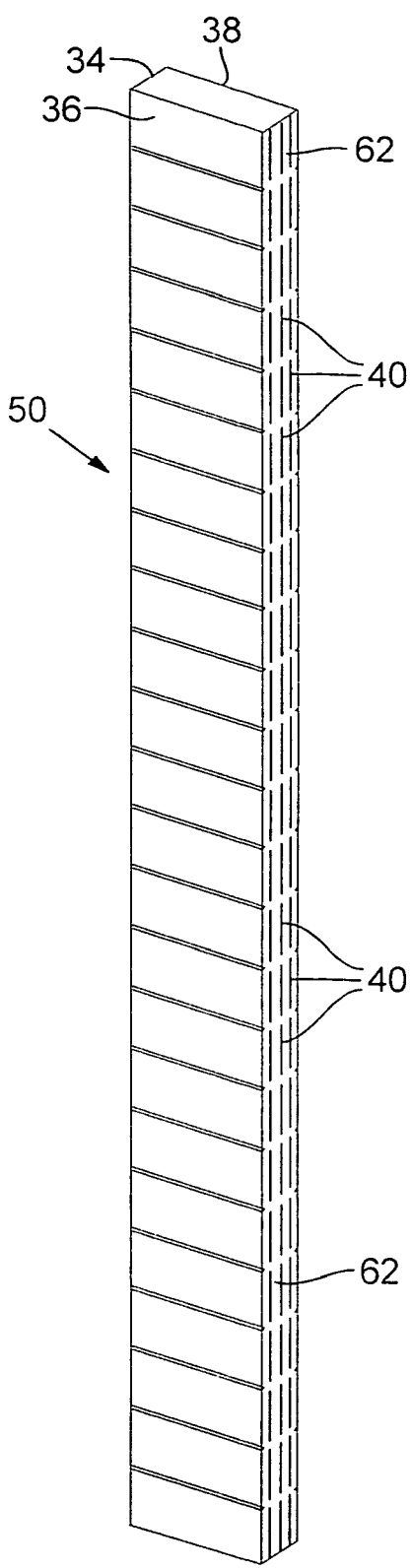
FIG. 13 is an isometric view of one of the major surfaces of a capacitor rowbar formed by breaking the substrate plate of FIG. 12.

As is described above with reference to resistors, substrate 34 is then broken into multiple rowbars 50, each of which includes side margins 62. Rowbars 50 are shown in FIG. 13. Breakage of substrate 34 into multiple rowbars 50 may be effected in any of the ways described above with respect to chip resistors.

Figure 14:
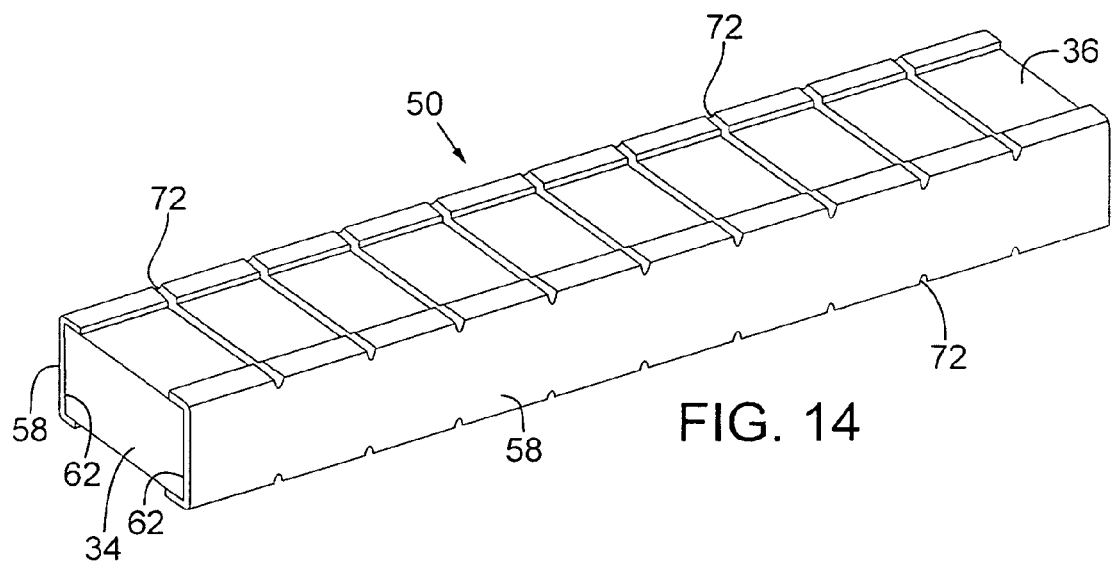
FIG. 14 is an isometric view of the rowbar of FIG. 13 having metallized side margins that form conductive interconnects of the interior electrodes and between the major surfaces.

Next, the electrically conductive material is applied to bridge across side margins 62 of rowbars 50 to form a conductive interconnect 58 for internal electrodes 40 and bond to the exposed stripes 90 of dielectric material on major surfaces 36 and 38. FIG. 14 is a diagram of rowbar 50 including side margins 62 that have been coated with an electrically conductive material to form conductive interconnects 58 over the previously exposed stripes 90. The electrically conductive material is preferably applied to rowbars 50 as is described above with reference to resistors.

Following application of the electrically conductive material and the formation of conductive interconnects 58 and electrical conductor lines, rowbar 50 is broken into multiple, discrete capacitors 54. Breakage of rowbars 50 into-multiple, discrete capacitors 54 may be effected in any of the numerous ways described above with reference to chip resistors.

As indicated above for capacitors 54, certain types of substrates do not carry electrical conductor lines and, therefore, present vacant major surfaces. Practice of the preferred methods on such types of substrates can be accomplished by forming electrical conductor lines during formation of conductive interconnects. A laser-ablative coating is applied to a major surface, and the UV laser beam removes the laser-ablative coating to expose the vacant locations where electrical conductor lines would have been present to form the spatially aligned pairs of upper and lower electrical conductors. After breaking apart the substrate to form rowbars, the electrically conductive coating material covers the exposed vacant locations to form electrical conductor lines and wraps around the side margins to form conductive interconnects with the electrical conductor lines.

The techniques described above can similarly be applied in the fabrication of other miniature electronic components, such as inductors and varistors.

One advantage of the present invention is that effecting removal of the laser-ablative coating while the substrate is in plate form facilitates maintenance of the alignment of the laser beam and the substrate. Alignment is effected by aligning the laser beam with a datum point. Thus alignment may be accomplished in various ways, including plate alignment and pattern alignment. An example of pattern alignment entails aligning the laser beam with one or both of the electrical conductor lines or with a scribe line. One advantage of implementing pattern alignment is that it minimizes or eliminates the need for the pattern to be accurately aligned with the substrate. An example of plate alignment entails aligning the laser beam with the ceramic plate itself or some portion thereof, such as its corners or alignment holes that have been drilled into the plate. By effecting the laser-ablative coating removal when the substrate is in plate form, alignment of the first and second opposed major surfaces may be maintained. This facilitates increased precision and cleaner rowbar side margins.

Another advantage of the present invention is that it creates a very accurate "wraparound" termination stripe on the chip resistor or capacitor. In the case of chip resistors, it creates a very straight line from the electrical conductor lines to the edge of the region of resistive material.

It will be obvious to those having skill in the art that many changes may be made to the details of the above-described embodiments without departing from the underlying principles of the invention. The scope of the present invention should, therefore, be determined only by the following claims.

What is claimed is:

1. A method of fabricating passive electronic components formed from a substrate having opposed first and second major surfaces carrying respective first and second mutually spaced-apart electrical conductors arranged lengthwise in spatially aligned different pairs of one first electrical conductor and one second electrical conductor, and including electrically conductive interconnects between the spatially aligned different pairs of first and second electrical conductors, comprising:
    applying laser-ablative coatings to the opposed first and second major surfaces of the substrate;
    directing for incidence on the substrate an ultraviolet (UV) laser beam having a spot size and an energy distribution sufficient to remove the laser-ablative coating from selected regions of the first and second major surfaces;
    aligning and imparting relative motion between the laser beam and each of multiple ones of the spatially aligned pairs of first and second electrical conductors to remove sufficient amounts of the laser-ablative coatings to expose the first and second electrical conductors along their lengths;
    breaking the substrate into multiple rowbars, each having side margins along which run different spatially aligned pairs of first and second electrical conductors; and
    applying an electrically conductive material along the side margins of the rowbars to form electrically conductive interconnects between the spatially aligned pairs of first and second electrical conductors.

2. The method of claim 1, in which the substrate includes a dielectric material.

3. The method of claim 2, in which the passive electronic components are capacitors.

4. The method of claim 1, in which one of the first major and second major surfaces of the substrate carries regions of resistive material positioned between adjacent ones of the first electrical conductors.

5. The method of claim 4, in which the passive electronic components are resistors.

6. The method of claim 1, further comprising removing from the rowbars residual amounts of the laser-ablative coatings after exposure of the first and second electrical conductors.

7. The method of claim 1, further comprising singulating the rowbars into discrete passive electronic components.

8. The method of claim 1, further comprising firing the rowbar.

9. The method of claim 1, in which the UV laser beam has a wavelength of less than about 400 nm.

10. The method of claim 9, in which the UV laser beam has a wavelength selected from the group consisting essentially of about 355 nm, about 266 nm, and about 213 nm.

11. The method of claim 1, in which the aligning of the UV laser beam involves aligning with a reference datum associated with the substrate.

12. The method of claim 11 in which the reference datum is at least one of the electrical conductors on one of the first and second major surface.

13. The method of claim 11, in which the reference datum is a scribe line.

14. The method of claim 11, in which the reference datum includes multiple holes drilled into the substrate.

15. The method of claim 1, in which the breaking of the substrate into multiple rowbars is accomplished by forming in the substrate a scribe line between an adjacent pair and along the lengths of one of the first and second electrical conductors and applying a breakage force to the substrate on either side of the scribe line to effect breakage of the substrate into separate pieces each including multiple regions of electric current-limiting material.

16. The method of claim 15, in which the scribe line is formed in the substrate before the first and second electrical conductors are exposed.

17. The method of claim 15, in which the scribe line is formed in the substrate after the first and second electrical conductors have been exposed.

18. The method of claim 15, in which the forming of a scribe line in the substrate involves aligning a UV laser beam characterized by an energy and a spot size with a street formed on the substrate that separates the regions of electric current-limiting material;
    imparting relative motion between the UV laser beam and the substrate such that the laser beam is directed lengthwise along the street and effects depthwise removal of substrate material to form a shallow trench, the energy and spot size of the UV laser beam effecting the depthwise removal in the absence of appreciable melting of the substrate material so that a trench formed in the substrate material has a width that converges from the substrate surface to a trench bottom in the form of a sharp snap line; and
    the shape of the trench forming a region of high stress concentration extending into a thickness of the substrate and along the snap line so that, in response to a breakage force applied to either side of the trench, multiple depthwise fractures propagate into the thickness of the substrate to effect clean breakage of the substrate into rowbars having side margins defined by the snap line.

19. The method of claim 1, in which the spot size has a diameter of about 30 microns.

20. The method of claim 1, in which the UV laser beam has an energy per pulse of between about 50 µJ and about 1000 µJ.

21. The method of claim 1, in which the substrate includes a ceramic material.

22. A method of fabricating passive electronic components formed from a substrate having opposed first and second major surfaces and including electrically conductive interconnects between spatially aligned different pairs of selected regions of the first and second major surfaces, comprising:

applying laser-removable coatings to the opposed first and second major surfaces of the substrate;

directing for incidence on the substrate a laser beam having a spot size and an energy distribution sufficient to remove the laser-removable coating from multiple selected regions of the first and second major surfaces;

aligning and imparting relative motion between the laser beam and each of the multiple selected regions of the first and second major surfaces to remove sufficient amounts of the laser-removable coatings to expose the multiple selected regions;

breaking the substrate into multiple rowbars, each having side margins along which are positioned different spatially aligned pairs of the selected regions of the first and second major surfaces; and applying an electrically conductive material along the side margins of the rowbars to form electrically conductive interconnects between the spatially aligned pairs of the selected regions of the first and second major surfaces.

23. The method of claim 22, further comprising forming in the substrate scribe lines located within the selected regions, the scribe lines defining the side margins of the rowbars.

24. The method of claim 23, in which the scribe lines are formed in the substrate before the laser-removable coatings are applied.

25. The method of claim 22, in which the laser beam is of an ultraviolet (UV) type and the laser-removable coatings are of a laser-ablative type.

\* \* \* \* \*